United States Patent Office 3,063,499
Patented Nov. 13, 1962

3,063,499
TREATING AN UNDERGROUND FORMATION
BY HYDRAULIC FRACTURING
Joseph C. Allen, Bellaire, Tex., assignor to Texaco Inc.,
a corporation of Delaware
No Drawing. Filed Mar. 3, 1959, Ser. No. 796,737
5 Claims. (Cl. 166—42)

This invention relates to the treatment of underground formations, particularly the treatment of oil and gas wells. More particularly, this invention relates to a method for increasing the fluid productivity of underground fluid-producing formations. Still more particularly, this invention relates to an improved method of increasing the productivity of a fluid-producing formation wherein a liquid is introduced into said formation in order to fracture the same.

It has been proposed to subject a fluid-producing formation whose fluid productivity and/or permeability is desired to be increased to a fluid pressure sufficiently high to effect fracturing, lifting or breaking-up of the formation. In accordance with this method a liquid or gel-like liquid is introduced into the well in contact with the formation to be fractured and then subjected to a pressure high enough to effect fracturing of the formation in contact therewith.

Various low penetrating, viscous or gel-like fluids have been proposed as fracturing fluids. For example, it has been proposed to employ as a fracturing fluid a hydrocarbon liquid, such as a liquid petroleum fraction, containing a bodying or gelling agent, such as a metallic salt of an organic acid. Exemplary of this type of fracturing fluid is a gasoline containing napalm, sodium palmitate, dissolved or admixed therein. Dilatant fluids have also been proposed as fracturing fluids.

One difficulty, however, in carrying out a formation fracturing operation employing a viscous or low penetrating fracturing fluid is the removal of the fracturing fluid from the resulting fractures when it is desired to commence production of fluids from the fractured formation. To this end it has been proposed to employ viscosity reducing agents or gel breaking agents in the fracturing fluid. Reliance upon the produced formation fluids themselves to dilute or to reduce the viscosity of viscous fracturing fluids has been had. Another difficulty is the tendency for the sand or propping agent often contained in the fracturing fluid to bridge or to plug the well bore entry to the fracture and the failure of a viscous fracturing fluid to uniformly deposit propping agent within the fracture.

It is an object of this invention to provide an improved formation fracturing operation.

Another object of this invention is to provide an improved formation fracturing operation wherein the fracturing fluid employed is a mobile, active liquid which readily penetrates the formation, enters the resulting fractures therein and which tends to uniformly deposit propping agent therein.

Still another object of this invention is to provide an improved formation fracturing operation wherein the deposition of propping agent, employed or admixed with the formation fracturing fluid to maintain the resulting fractures permeable, is improved.

Yet another object of this invention is to provide an improved formation fracturing operation wherein the fracturing fluid is readily removed from the fractures.

How these and other objects of this invention are obtained will become apparent in the light of the accompanying disclosure. In at least one embodiment of the practice of this invention at least one of the foregoing objects will be achieved.

In accordance with this invention a formation fracturing operation wherein a liquid is applied to an underground fluid-producing formation to be fractured at a pressure sufficient to fracture said formation in order to increase formation productivity and/or permeability, is improved by employing as said fracturing fluid a liquid which contains dissolved therein a substantial amount of a gas. More particularly, an improved formation fracturing operation is obtained by employing as the formation fracturing fluid a liquid which is substantially saturated with a gas or which contains a gas dissolved therein to the extent such that a substantial amount of gas, e.g. at least about 50 standard cu. ft. of gas per bbl. of liquid, is dissolved in the liquid. The resulting gas-pressured or gas-containing liquid is placed in contact with the formation undergoing treatment or to be fractured and pressure applied to the liquid sufficient to fracture the formation.

When the formation is fractured the gas-pressured liquid as it enters the fractures will have gas expelled therefrom due to a sudden decrease in pressure as the formation is opened up and fractured. Due to this violent expulsion of gas from the fracturing liquid as it enters the fractures when fracturing occurs any propping agent admixed with the fracturing fluid in violently expelled and forced into the formation. Desirably the application of pressure upon the fracturing fluid is continued in order to extend the thus-created fractures. As pressure is again applied to the fracturing fluid within the well bore and fractures the gas expelled therefrom during the fracturing operation tends to be redissolved as the fracturing liquid is forced into the fractures to extend these fractures. When the formation has been fractured to the desired extent the fracturing fluid can readily be removed from the fractures and from the formation as the treated, fractured formation is placed back in production.

Any suitable liquid may be employed for the preparation of a gas-saturated or gas-pressured fracturing fluid in accordance with the practice of this invention. Particularly suitable for use in the fracturing of a petroleum-producing formation or a gas-producing formation is a hydrocarbon or petroleum liquid such as a liquid hydrocarbon or petroleum fraction boiling in the range 100–800° F., more or less. Suitable petroleum fractions include gasoline, kerosene, diesel oil, gas oil, residual oils, lube oil fractions, petroleum fractions which contain a gelling agent therein to render the liquid more viscous and less penetrating, and the like. Also suitable as a fracturing fluid in the practice of this invention is water, formation brines and similar aqueous liquids which may or may not, as desired, contain viscosity-increasing additives. Gas-pressured aqueous liquids are particularly suitable in the practice of this invention as applied to the fracturing of aqueous fluid-producing or water-producing formations.

Any gas which is soluble to a substantial extent under pressure in the fracturing liquid may be employed in the practice of this invention. Particularly suitable in the practice of this invention is natural gas and similar normally gaseous hydrocarbons such as methane, ethane, propane, butane, mixtures thereof and the like. These normally gaseous hydrocarbons are readily soluble in hydrocarbon liquids to a substantial extent, depending on temperature and pressure. For example, upon the application of pressure these normally gaseous hydrocarbons will readily dissolve in hydrocarbon liquids to a very substantial extent. The higher the applied pressure, the greater the amount of normally gaseous hydrocarbons that will be dissolved in the hydrocarbon liquid.

Other normally gaseous materials such as sulfur dioxide, carbon dioxide and the like may be utilized in the preparation of the gas-pressured fracturing fluids employed in the practice of this invention. These gaseous materials, in addition to having a substantial solubility in hydrocarbon liquids, are also soluble in aqueous liquids such as water and formation brines. Moreover, liquids containing these gases dissolved therein evidence acidic reaction when introduced into suitable formations and serve to further increase the effectiveness of the fracturing fluid in increasing the permeability of the fractured formation by chemically reacting with or dissolving away the formation minerals such as carbonates and the like which may be reactive therewith.

In the preparation of a gas-pressured fracturing fluid in accordance with this invention it is preferred that there be dissolved in the fracturing fluid a substantial amount of gas, such as an amount at least about 50 standard cu. ft. of gas per bbl. of liquid. This amount of gas dissolved in the fracturing liquid is usually readily obtained by the application of pressure, such as a pressure of at least about 500 p.s.i.g. Depending upon the gaseous material to be dissolved and the liquid carrier higher or lower pressures such as pressures in the range 200–2000 p.s.i.g. might be required to effect dissolution of the gas in the liquid to the desired extent; as indicated hereinabove an increase in pressure effects an increase in the solubility of gas in a liquid whereas an increase in temperature tends to decrease the solubility of a gas in a liquid. Accordingly in the practice of this invention it is preferred to employ the gas-pressured fracturing fluid at ambient field temperature such as a temperature in the range 50–250° F., more or less. Higher or lower temperatures, however, might be employed provided sufficient gas solubility in the carrier liquid is maintained.

The pressure required to fracture the formation being treated seldom exceeds in lbs. per sq. in. gauge (p.s.i.g.), as measured at the formation, the depth of the formation in feet. It is obvious, therefore, that the required fracturing pressure varies from place to place depending upon the depth and/or the nature of the formation to be fractured. Usually the fracturing pressure is in the range 2,000–15,000 p.s.i.g. and higher.

Exemplary of the practice of this invention employing a gas-saturated, hydrocarbon liquid, such as diesel oil or kerosene, as the fracturing fluid, a petroleum fraction in the kerosene-diesel oil boiling range is saturated with natural gas at a temperature in the range 50–250° F. and at a pressure of at least 500 p.s.i.g. so that there is dissolved in the petroleum liquid at least about 50 s.c.f. of natural gas per bbl. of liquid, such as an amount of natural gas in the range 160–2000 s.c.f. per bbl. of liquid. Generally the more gas dissolved in the fracturing liquid the more effective is the fracturing operation in accordance with this invention. The thus gas-pressured liquid is introduced as a single liquid phase into the well bore in contact with the formation to be fractured. Pressure is then applied to the liquid in contact with the formation sufficient to fracture the formation. When the formation is fractured the fracturing fluid quickly enters the fractures and as the fluid enters the fractures due to a sudden pressure decrease gas is expelled from the fracturing liquid, leading to a relatively violent movement of fracturing fluid, natural gas and petroleum fraction, into the fracture. Upon continued pumping and application of pressure upon the fracturing fluid within the well bore and within the fractures the thus-expelled gas is redissolved within the fracturing fluid and the fractures extended. When the formation fracturing operation has been carried out to the desired extent the fracturing fluid is then removed from the fractures and well bore by normal, conventional production methods, the gas dissolved in the fracturing fluid acting as solution gas in a solution gas drive.

Removal of the fracturing fluids from the fractures and well bore can be carried out directly after the fracturing operation or can be carried out at a controlled rate as the well is placed back in production for the production of the desired formation fluids. The recovery of fracturing fluid is facilitated since the gas dissolved therein makes the fluid less viscous and more fluent and mobile and, accordingly, more readily recoverable from the fractures and the formation.

In accordance with one embodiment of the practice of this invention there is admixed with the gas-pressured fracturing fluid a suitable amount of propping agent such as sand, e.g. Ottawa Sand, of suitable conventional mesh size. In accordance with this feature of applicant's invention when the formation has been fractured and the pressurized fracturing fluid containing propping agent admixed therewith enters the fractures, bridging or plugging of the fracture at the zone of entry thereinto from the well bore due to pile-up of the propping agent is avoided because of the relatively violent expulsion of gas from the fracturing fluid carrying with it the fracturing liquid and propping agent as the fracturing fluid enters the fracture. Further due to the violent expulsion of gas from the fracturing fluid the distribution of the propping agent within the fracture is more uniform and more complete, reaching even into the more remote portions of the fracture from the well bore.

As will be apparent to those skilled in the art in the light of this disclosure many modifications, changes and substitutions are possible in the practice of this invention without departing from the spirit or scope thereof.

I claim:

1. A method of treating an underground normally liquid petroleum-containing petroleum-bearing formation which comprises forming a saturated solution of a normally gaseous hydrocarbon in a petroleum liquid at a pressure of at least about 500 p.s.i.g., the resulting solution containing at least about 50 s.c.f. of said gaseous hydrocarbon dissolved therein per bbl. of said petroleum liquid, introducing the thus-formed resulting solution as a single liquid phase into a well bore into contact with said petroleum-bearing formation, applying a pressure upon the thus-introduced solution sufficient to fracture hydraulically said formation, causing said solution to enter a fracture thus-created with the result that as said solution enters into said fracture, gas is expelled therefrom to form a two phase admixture of gas and liquid within said fracture, continuing the application of pressure upon said solution in said well bore and upon the admixture of gas and liquid within said fracture to cause the thus-expelled gas to redissolve in said liquid therein and continuing pressuring said solution in said well bore and in said fracture to extend said fracture and to substantially completely fill said fracture with said solution, said solution containing admixed therewith sand for use as a propping agent in said fracture, the expulsion of gas from said solution providing a more uniform and complete distribution of said sand within said fracture and preventing plugging of said fracture at the zone of entry thereinto from said wellbore.

2. A method in accordance with claim 1 wherein said normally gaseous hydrocarbon is natural gas.

3. A method in accordance with claim 1 wherein said hydrocarbon liquid is a petroleum fraction boiling in the range 100–800° F.

4. A method in accordance with claim 1 wherein said solution is formed by dissolving natural gas in a petroleum fraction boiling in the range 100–800° F. at a pressure and at a temperature of at least 50° F. such that the amount of natural gas dissolved in said petroleum fraction is at least 50 s.c.f. per bbl. of liquid petroleum fraction.

5. A method in accordance with claim 1 wherein said hydrocarbon liquid is a diesel oil fraction.

References Cited in the file of this patent
UNITED STATES PATENTS

| | | |
|---|---|---|
| 2,596,844 | Clark | May 13, 1952 |
| 2,596,845 | Clark | May 13, 1952 |
| 2,796,129 | Brandon | June 18, 1957 |
| 2,876,839 | Fast et al. | Mar. 10, 1959 |
| 3,004,594 | Crawford | Oct. 17, 1961 |